United States Patent [19]
Goto

[11] Patent Number: 5,960,217
[45] Date of Patent: Sep. 28, 1999

[54] WIDE RANGE FOCUSING CAMERA

[75] Inventor: Tadashi Goto, Yokohama, Japan

[73] Assignee: Goko International Corporation, Kanagawa-ken, Japan

[21] Appl. No.: 08/967,462

[22] Filed: Nov. 11, 1997

[30] Foreign Application Priority Data

| Mar. 24, 1997 | [JP] | Japan | 9-088765 |
| May 29, 1997 | [JP] | Japan | 9-140247 |

[51] Int. Cl.⁶ .............................. G03B 7/16; G03B 9/02
[52] U.S. Cl. ............................. 396/65; 396/89; 396/170; 396/179; 396/257; 396/505
[58] Field of Search ................................ 396/61, 65, 69, 396/67, 66, 70, 89, 73, 168, 170, 166, 505, 257, 179

[56] References Cited

U.S. PATENT DOCUMENTS

| 4,316,658 | 2/1982 | Bundschuh et al. | 396/65 |
| 4,459,005 | 7/1984 | Harvey | 396/166 X |
| 5,047,792 | 9/1991 | Asano et al. | 396/61 |
| 5,124,739 | 6/1992 | Kelleher | 396/166 |
| 5,162,837 | 11/1992 | Katsuki | 396/61 |
| 5,771,408 | 6/1998 | Mizukawa | 396/65 |

FOREIGN PATENT DOCUMENTS 5-313223  11/1993  Japan .

OTHER PUBLICATIONS

Dan Richards, "A Good–and Cheap–Closeup Camera? One May Be On The Way", Popular Photography, Sep. 1997.
Herbert Keppler, "A Really New Type of Point–and–Shoot?", Photo Industry Reporter, Sep. 1997.
Unknown, "Merry band of point & shoots . . . ", Popular Photography, May 1998.
Unknown, brochure for the Macromax FR–2200.

*Primary Examiner*—W. B. Perkey
*Attorney, Agent, or Firm*—Skjerven, Morrill, MacPherson, Franklin & Friel LLP; Alan H. MacPherson; Hugh H. Matsubayashi

[57] ABSTRACT

In a wide range focusing camera, a cooperating engagement members are provided in moveable parts of a focusing mechanism and an aperture opening selecting mechanism so as to force the latter into selecting a smaller one of the aperture opening areas when the focusing mechanism is actuated into moving the lens to the position suitable for a close range shot. At the same time, a strobe light is enabled. Thus, the focal depth can be increased, and a clear picture of a close range object can be taken without regard to the condition under which the object is placed in relation with the surrounding objects. Also, a three-dimensional object having a depth can be photographed at close range with a satisfactory result. Because a number of settings required for such close-up shots are instantaneously set either manually by hand or automatically by an auto-focusing mechanism, it is possible even for an inexperienced photographer to take clear pictures of objects at close range.

32 Claims, 11 Drawing Sheets

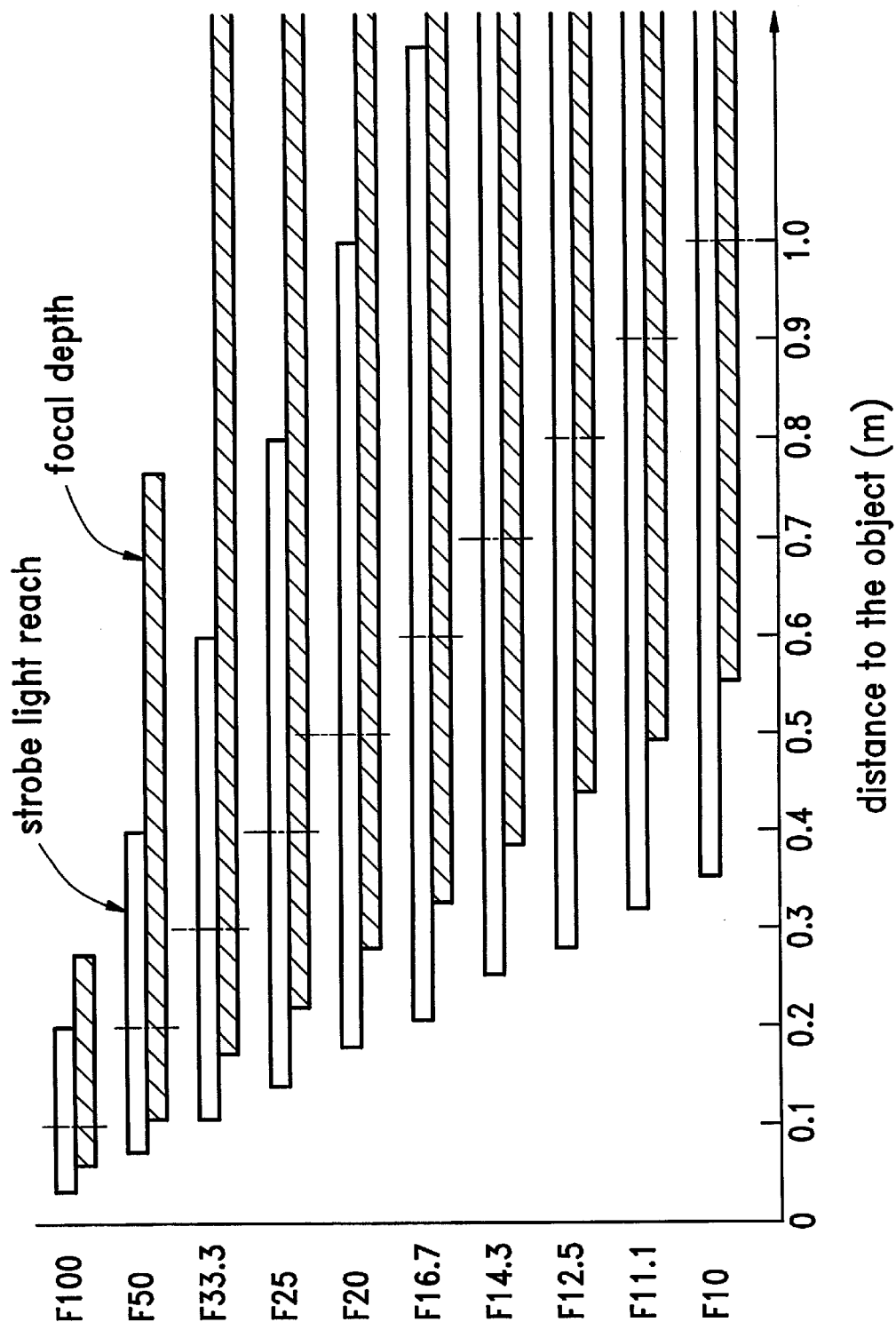

WIDE RANGE FOCUSING CAMERA

TECHNICAL FIELD

The present invention relates to a wide range focusing camera which can take clear pictures of objects over a wide distance range, and in particular to a wide range focusing camera which can take clear pictures of objects at extremely close range.

BACKGROUND OF THE INVENTION

Conventionally, a camera, in particular a compact camera, is capable of taking clear pictures only when the object is at least approximately one meter away. Some of the cameras are equipped with a macro mode which allows a clear picture to be taken even when the object is as close as 60 cm away. However, the pictures which can be obtained by these cameras are often unsatisfactory because the surrounding objects which are located in front and behind the central objects cannot be properly focused. In particular, when the object has a three-dimensional shape, and has a depth, it was not possible to achieve a favorable focusing over the entire object. Furthermore, it has not been possible with the exception of certain specialized cameras to take a clear picture of an object which is at an extremely close range, for instance in the distance range of 10 to 30 cm.

The difficulty in overcoming these limitations may be attributed to the fact that the lens of the camera must travel over a large distance in order to cover such a close range as well as an infinitely far range. Incorporating the camera with a lens actuating mechanism capable of moving the lens over such a large distance in a normal camera has been considered impractical from both technical and commercial view points. Furthermore, the lenses of such cameras have not been able to provide a sufficient focal depth to allow a three-dimensional object to be photographed at an extremely close range. In the case of a compact camera, it is also essential that the user is not required to make any complicated adjustments.

BRIEF SUMMARY OF THE INVENTION

In view of such problems of the prior art, a primary object of the present invention is to provide a simple camera which can take clear pictures even when the object is as close as only 10 to 30 cm away from the camera without sacrificing the capability of the camera to cover the infinitely far range.

A second object of the present invention is to provide a simple camera which is capable of taking pictures at a close range while ensuring a large focal depth which has hitherto not been available.

A third object of the present invention is to provide a simple camera which is equipped with a macro operative mode and suitable for use by general consumers.

According to the present invention, these and other objects of the present invention can be accomplished by providing a wide range focusing camera, comprising; a lens moving means for moving a lens of the camera for selecting a distance range for a clear photographic shot; an aperture opening changing means for changing an aperture opening of the camera; a lighting device for illuminating an object of the camera; and a selector switch for selecting from a normal operative mode and a super macro operative mode; the normal operative mode being defined in a such a way that the lens is positioned for a shot at a normal distance range, and the aperture opening is selected for a normal shot; the super macro operative mode being defined in a such a way that the lens is positioned for a shot at a closer distance range which adjoins the normal distance range, the lighting device is activated, and the aperture opening is reduced so as to be compatible with the activation of the lighting device at the closer distance range. Preferably, the selector switch includes a single member or two push-buttons which consolidate all the necessary adjustments. According to this inventive concept, the aperture opening for the super macro operative mode is typically pre-determined.

Thus, according to the present invention, because a number of settings which make the camera suitable for close range photographing can be achieved with a single operation, even an inexperienced person can take a satisfactory picture of an object at a close range. In particular, by reducing the aperture opening when the super macro mode is selected, the focal depth can be increased, and a clear picture of the close range object can be taken without regard to the condition under which the object is placed in relation with the surrounding objects. Hence, a three-dimensional object having a depth can be photographed with a satisfactory result. By enabling a lighting device such as a strobe light or a flash bulb when the super macro mode is selected, the small aperture opening area that is required for increasing the focal depth can be selected without causing any insufficient photographic exposure of the photographic film. Although the present invention was contemplated for application as photographic cameras, it can be equally applicable to digital cameras having a CCD image sensor at the focal plane. To allow the camera to truly cover the far and near ranges without any break, the normal distance range and the closer distance range preferably overlap each other.

The control member may be actuated not only manually but also by a powered motor. In the latter case, the powered motor may be actuated according to an output signal from a range sensor so that the focusing is automatically adjusted, and the macro mode may be automatically selected when the object to be photographed is detected to be at a sufficiently close range.

The aperture opening area may be determined by any known mechanism, for instance by a plurality of aperture control blades. Because the aperture opening is required to be fairly small when the super macro mode is selected, the aperture opening may be determined by a moveable plate member having a plurality of aperture openings formed therein and adapted to be selectively moved so as to place a selected one of the aperture openings in an optical axial line of the lens, or by a combination of a plurality of aperture control blades, and a moveable plate member having an aperture opening formed therein and adapted to be selectively moved so as to place the aperture opening in an optical axial line of the lens.

To cover an even closer range, the selector switch may additionally allow selection of an ultra super macro operative mode which is defined in a such a way that the lens is positioned for an even closer distance range which adjoins the super macro distance range, the lighting device is activated, and the aperture opening is reduced so as to be compatible with the activation of the lighting device at the even closer distance range. In this case also, the aperture opening may be pre-determined, and the closer distance range and the even closer distance range may overlap each other.

In more concrete terms, the present invention provides a wide range focusing camera, comprising: a focusing mechanism for selectively moving a lens of the camera to at least two different positions which are suitable for a relatively long distance shot and a relatively short distance shot, respectively; an aperture opening selecting mechanism for defining at least two different aperture opening areas; a control member for actuating the focusing mechanism so as to move the lens to a selected one of the two positions; and cooperating engagement members provided in moveable parts of the focusing mechanism and the aperture opening selecting mechanism so as to move the aperture opening selecting mechanism into selecting a smaller one of the aperture opening areas when the focusing mechanism is actuated into moving the lens to the position suitable for a close range shot.

So as not to interfere with the existing mechanism for selecting the settings which are suitable for the normal operative mode, a lost motion mechanism may be incorporated in the mechanism for coordinating the movement of the focusing mechanism and the aperture opening selecting mechanism so that the aperture opening selecting mechanism may select a smaller one of the aperture opening areas without interfering with a member for selecting an aperture opening area when the lens is at the position suitable for a long range shot.

When a fully automated mode selection is desired or a motor powered mode selection is desired, the present invention may provide a wide range focusing camera, comprising: a focusing mechanism for selectively moving a lens of the camera to at least two different positions which are suitable for a relatively long range shot and a relatively short range shot, respectively; an aperture opening selecting mechanism for defining at least two different aperture opening areas; a first motor for actuating the focusing mechanism; a second motor for actuating the aperture opening selecting mechanism; and an electric circuit for coordinating the second motor with the first motor so that the aperture opening selecting mechanism may select a smaller one of the aperture opening areas when the lens is moved to the position suitable for a relatively short range shot.

In this case, two electric motors are required, but the mechanism for coordinating the focusing mechanism and the aperture opening selecting mechanism may be simplified. Also, the camera may be equipped with an automatic focusing mechanism which actuates the first motor according to a signal from a range sensor.

BRIEF DESCRIPTION OF THE DRAWINGS

Now the present invention is described in the following with reference to the appended drawings, in which:

FIG. 12 is a diagram showing the acceptable strobe light reach and the focal length for different aperture openings and distances to the object;

DETAILED DESCRIPTION OF THE PREFERRED EMBODIMENTS

Figure 1:
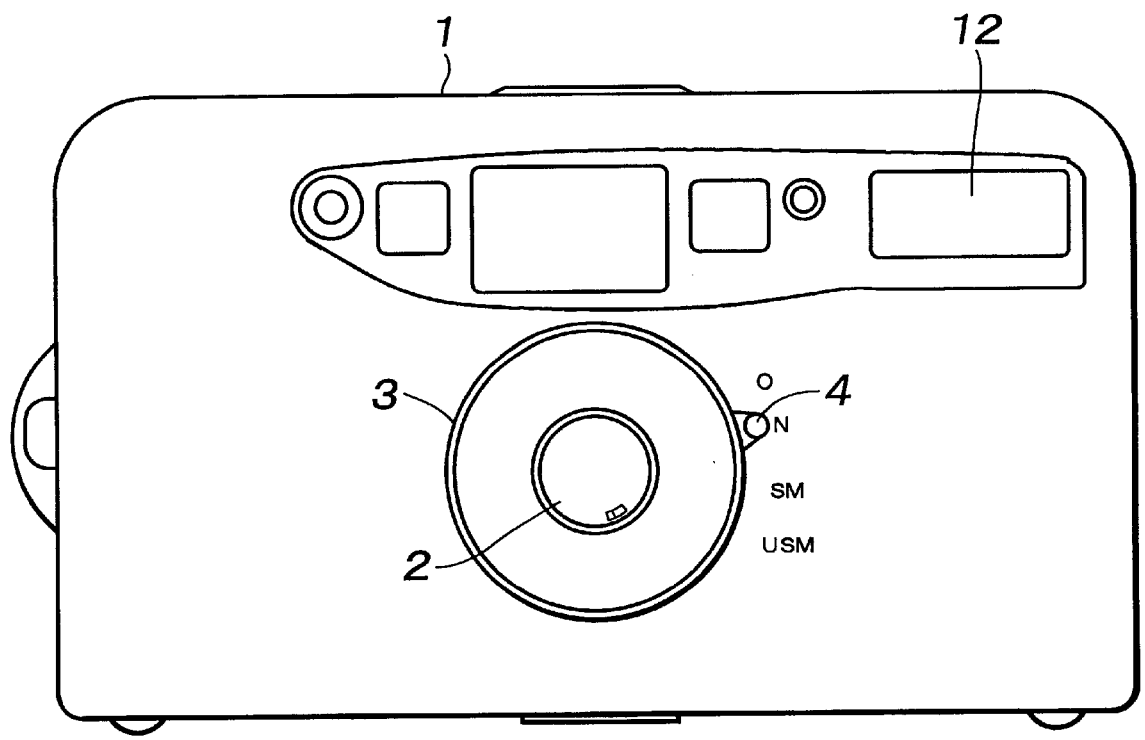
FIG. 1 is a front view of a compact camera to which the present invention is applied.

FIG. 1 is a front view of a compact camera to which the present invention is applied. A lens 2 is placed centrally in the front portion of a camera body 1, and is surrounded by an ornamental ring 3. An operation mode selection lever 4 serving as means for moving the lens projects integrally and radially from the ornamental ring 3.

The operation modes include a non-operative mode (O) for closing the lens with a barrier (not shown in the drawings), a normal operative mode (N) for taking pictures of objects at a distance of 1.0 m or further, a super macro operative mode (SM) for taking pictures of objects in a distance range of 30 cm to 1.0 m, and an ultra super macro operative mode (USM) for taking pictures of objects in a distance range of 10 cm to 30 cm. Each one of these operation modes can be selected by turning the ornamental ring 3 to a corresponding one of four angular positions thereof with the mode selection lever 4.

The internal structure of this camera is described in the following with reference to FIGS. 2 and 3. A cam tube 5 is fixedly secured inside the camera body 1 coaxially with respect to the ornamental ring 3. A retaining tube 6 retaining the lens 2 therein is coaxially received in the cam tube 5 in an axially slidable manner, and is integrally attached to the ornamental ring 3 having the mode selection lever 4 integrally projecting therefrom so that the retaining tube 6 turns integrally with the mode selection lever 4.

A cam pin 6a projecting integrally from the outer circumferential surface of the retaining tube 6 is engaged by a spiral cam slot 5a formed in the outer wall of the cam tube 5. As a result, the retaining tube 6 travels axially as the retaining tube 6 is turned with the cam pin 6a engaged by the cam slot 5a. The spiral lead of the cam slot 5a is determined such that the forward movement of the retaining tube 6 accelerates as the lever 4 is turned from the normal operative mode position to the ultra super macro mode position. This is due to the fact that the displacement of the focal point progressively increases as the distance to the object diminishes when a lens of a fixed focal length is used. Thus, by turning the lever 4, the lens 2 is axially moved so as to define a focal point on a film surface according to the distance to the object.

An aperture control mechanism or a variable aperture mechanism is incorporated in the retaining tube 6. The aperture control mechanism may be of a conventional type which includes a plurality of aperture control blades 7a. The aperture control blades 7a are jointly engaged by a ring member 7b which is coaxially received in the retaining tube 6 in such a manner that the overlapping state of the aperture control blades 7a is changed in synchronism with the rotation of the ring member 7b, and a central opening 7c defined by the aperture control blades 7a is varied in diameter. The ring member 7b can move axially jointly with the retaining tube 6.

Figure 3:
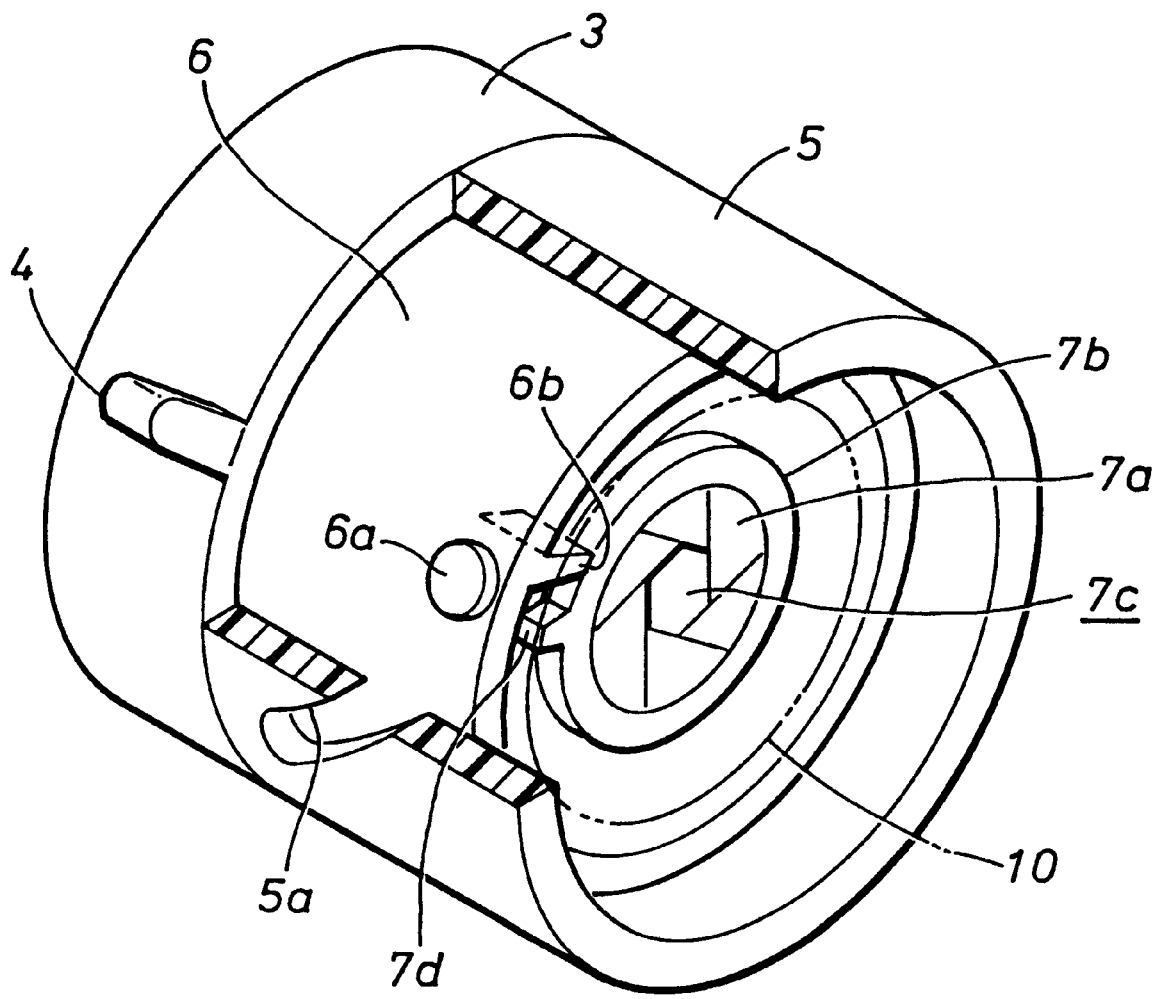
FIG. 3 is a partly broken-away perspective view of a lens assembly of the camera shown in FIGS. 1 and 2.

A shutter 10 is placed between the aperture control mechanism and the film surface as indicated by the imaginary lines in FIG. 3. The camera body 1 further includes a shutter button 11, and a strobe light 12.

Figure 2:
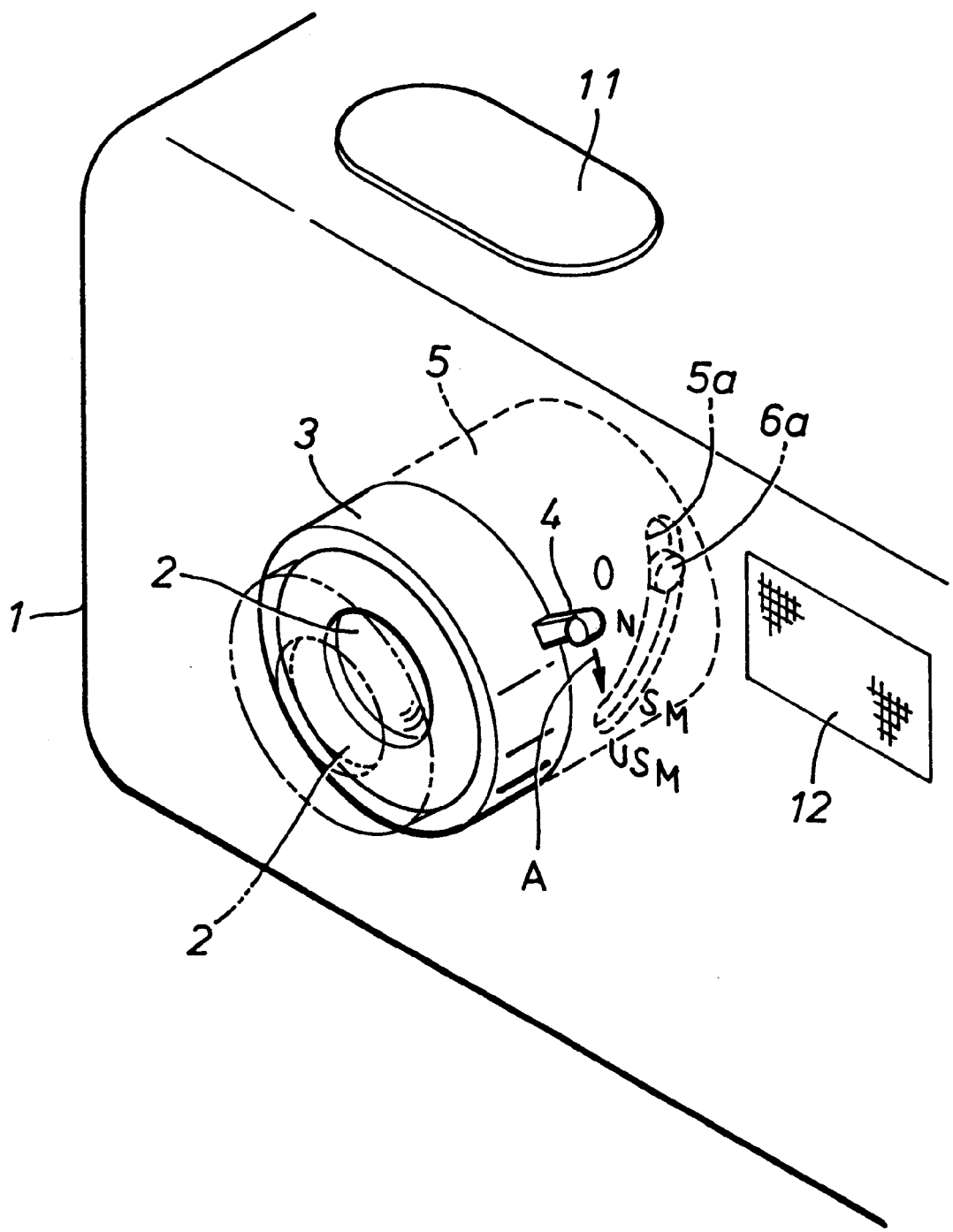
FIG. 2 is a fragmentary perspective view of the camera.

FIGS. 4 to 7 are conceptual views for illustrating the mode of operation of the embodiment illustrated in FIGS. 1 to 3. The shapes of the various parts and the geometric relationships between the various components are modified for the ease of illustration, and are not intended to be accurate.

In this embodiment, the ring member 7b is integrally provided with an engagement piece 7d extending radially outwardly therefrom, and the inner circumferential surface of the retaining tube 6 is provided with an engagement arm 6b which extends radially inwardly therefrom, and engages the engagement piece 7d. The ring member 7b is further integrally provided with an actuating arm 7e which engages an aperture control lever 8 for changing the aperture opening in the normal operative mode, and a tension coil spring 9 is connected between the actuating arm 7e and a fixed part of the camera body 1 so that the ring member 7b is urged in the direction to increase the opening of the aperture control mechanism.

The aperture control lever 8 engages the actuating arm 7e against the biasing force of the spring 9. The position of the aperture control lever 8 is adjusted by a motor or a solenoid according to a signal from a light sensor not shown in the drawing, or is simply set manually by the user of the camera.

Figure 4:
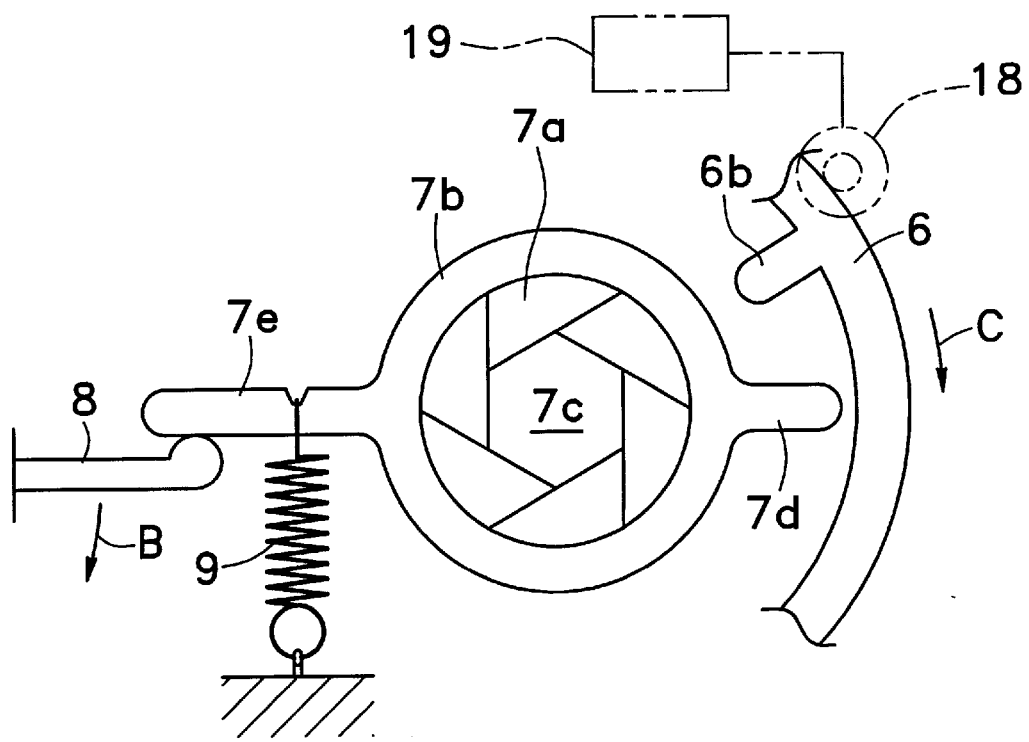
FIGS. 4 to 7 are diagrams showing the internal structures of the lens assembly in different operating modes.

The mode of operation is described with the following with reference to FIGS. 4 to 7. When an object at 1.0 m or further is to be photographed by this camera, the aperture control mechanism is set at a value which is suitable for taking a picture in a relatively bright surrounding without the aid of the strobe light. When the mode selection lever 4 is at the normal operative position (N), the engagement arm 6b is out of engagement from the engagement piece 7d as illustrated in FIG. 4.

Figure 5:
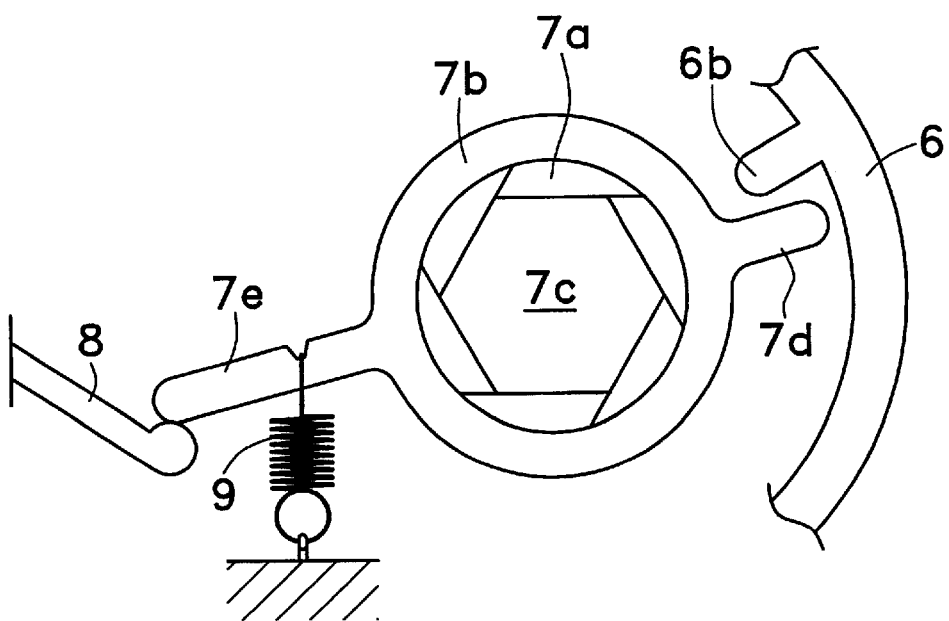

In this normal operative mode, when a picture is to be taken under an insufficiently lighted condition, for instance after dark or indoors, the strobe light 12 is enabled either manually or by the light sensor which has detected the insufficiency of lighting. The aperture control lever 8 is then actuated either automatically or manually in the direction indicated by arrow B in FIG. 4 until the lever reaches a prescribed position. As a result, the actuating arm 7e follows the movement of the aperture control lever. 8 under the spring force of the tension coil spring 9, and the ring member 7b turns in counter-clockwise direction in the drawing so as to place the aperture opening 7c in a wide open state as illustrated in FIG. 5. Thus, in the normal operative mode, either one of the states illustrated in FIGS. 4 and 5 are appropriately selected depending on the amount of the surrounding light, and a picture is taken by pressing the shutter button 10. It is also possible that the aperture control lever 8 can take a selected number of positions or any continually selectable position between the two states illustrated in FIGS. 4 and 5 depending on the amount of light detected by the light sensor, or according to a manual selection.

When the super macro mode (SM) is desired to be selected for taking a picture of an object in a distance range of 30 cm to 1.0 m, the operation mode selection lever 4 is turned in the direction indicated by arrow C in FIG. 4 to the super macro mode position (SM). This causes the lens 2 to be pushed forward owing to the cam pin 6a moving along the cam slot 5a while the engagement arm 6b which is integral with the retaining tube 6 moves in the direction indicated by arrow D in FIG. 6 to the position illustrated in FIG. 6. The aperture control blades 7a thus move in the direction to reduce the aperture opening 7c, for instance to 1.2 mm in diameter. For instance by producing a suitable frictional resistance by the mutual fitting of the retaining tube 6 and the cam tube 5, it is possible to keep the retaining tube 6 stationary in the illustrated state in spite of the spring force of the tension coil spring 9. If necessary, a suitable detent mechanism may be used to keep the mode selection lever 4 stationary at each selected position.

When this super macro mode was actually defined for a 35 mm camera having a focal length of 35 mm, the focal setting was set for an object which is located 70 cm away from the camera, the aperture control was selected at F22, and the strobe light 12 was enabled. In this super macro mode, it was possible to take a satisfactory picture of an object in the distance range of 30 cm to 1.2 m. Thus, this mode enables the taking of a clear picture of stationary objects, fruits, paintings, insects, flowers, china ware and so forth at a suitable scale.

Figure 6:
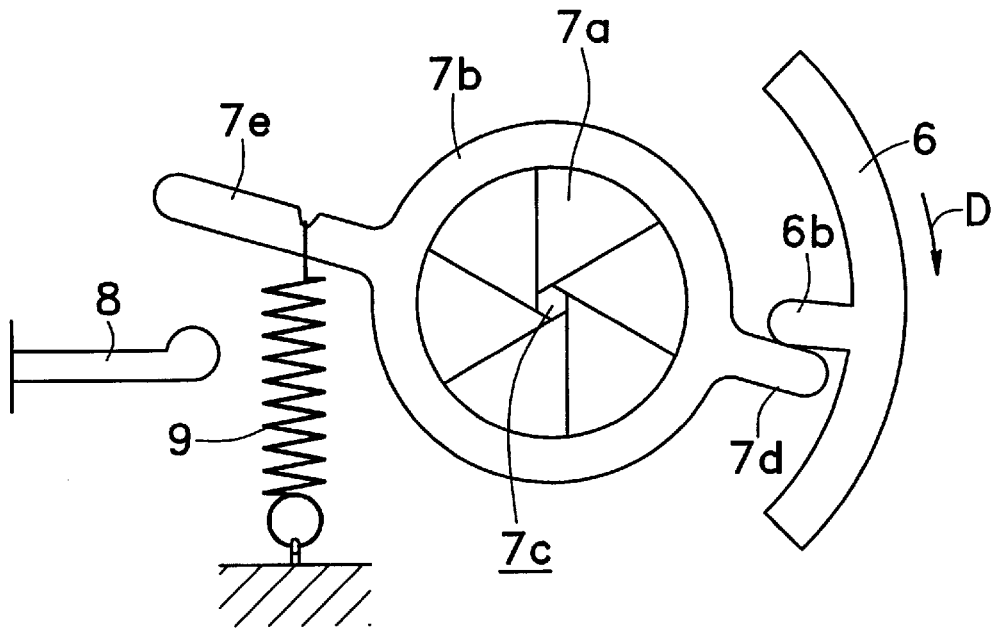
Figure 7:
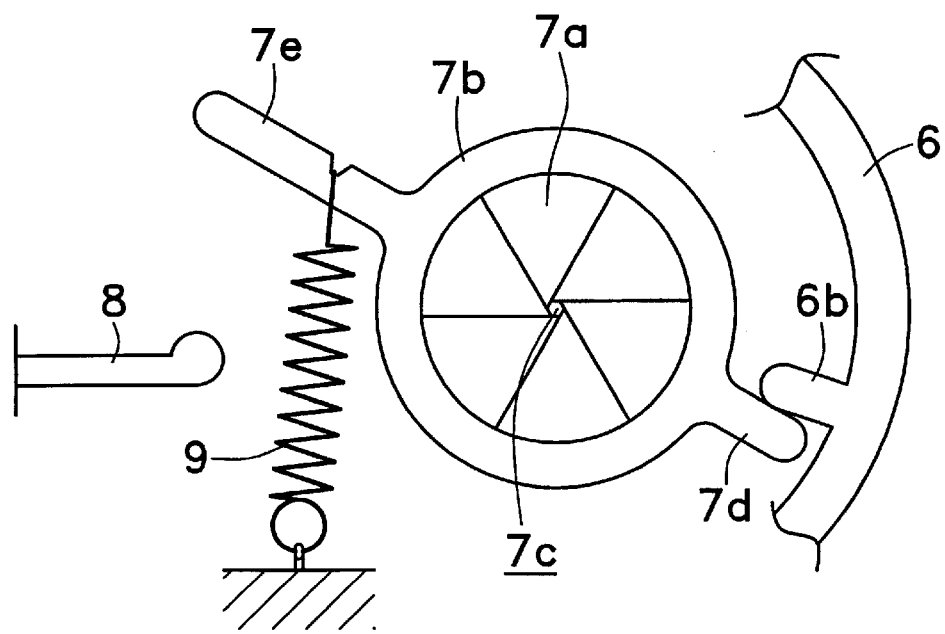

When the mode selection lever 4 is turned further in the direction indicated by arrow D in FIG. 6 to the ultra super macro position (USM), the retaining tube 6 is turned by a prescribed angle until the engagement arm 6b moves to the position illustrated in FIG. 7. The aperture opening 7c is further reduced in diameter, for instance to 0.7 mm. The aperture control position is set at F44. In this ultra super macro mode (USM), the lens 2 is pushed to a front most position to thereby place the lens 2 suitable for forming an image of an object 17 cm away from the camera on the film surface.

This ultra super macro mode (USM) was actually applied to the camera mentioned in association with the super macro mode (SM). This setting allowed a clear picture to be taken of an object which is in a distance range of 10 cm to 40 cm. In particular, when the object is placed 10 cm away from the camera, the image of the object on a regular size photograph print was approximately 1.7 times the actual size. Thus, this mode allowed the object to be recorded in an enlarged scale without any enlargement or trimming.

These macro modes are each defined by selecting a set of conditions such as the lens position, the aperture control position and the enabling of the strobe light. These settings can be mechanically achieved by turning of a mode selection lever as described above, but can be also electronically achieved by incorporating the camera with a CPU and a motor actuator.

The aperture control blades used in some of the compact cameras may not be suitable for achieving small aperture openings at high precision. This problem can be avoided by providing a plate member 13 having small openings 13a and 13b for the super macro mode and the ultra super macro mode therein, and placing the plate member 13 before or after the aperture control blades 7a. The plate member 13 in the embodiment illustrated in FIG. 8 is pivotally supported at a point 13c so that each of the small openings 13a and 13b may be aligned with the aperture opening 7c of the aperture control mechanism, and its pivotal movement is synchronized with the rotation of the retaining tube 6 by meshing of a sector gear 13d integrally formed in the plate member 13 with an internal gear 6c formed in the retaining tube 6 via an idle gear 14.

Figure 8:
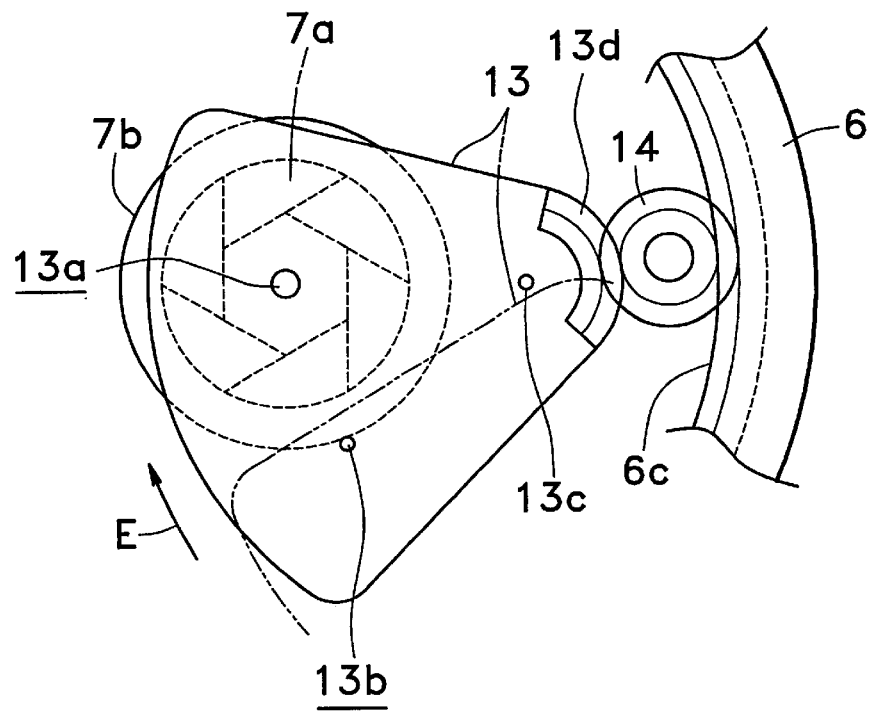
FIG. 8 is a diagram showing a second embodiment of the present invention.

According to the embodiment illustrated in FIG. 8, the plate member 13 is in a retracted position to be placed out of the way from the aperture control blades 7a in the normal operative mode as indicated by the imaginary lines. When the super macro mode (SM) is selected, the plate member 13 pivots in the direction indicated by arrow E to the position indicated by solid lines in FIG. 8, and the aperture opening is determined by the relatively larger one of the small openings 13a of the plate member 13 which is aligned with the optical axial line. Similarly, when the ultra super macro mode (USM) is selected, the extremely small opening 13b is aligned with the optical axial line instead of the small opening 13a.

When the aperture control blades 7a are employed for determining the aperture opening 7c, it is possible to continually vary the aperture opening not only for the normal operative mode but also for the macro modes, instead of defining a limited number of settings for step-wise selection. Likewise, it is also possible to allow the focusing to be continually set not only in the normal operative mode but also over the entire range including both the normal operative mode and the macro modes. If desired, the plate member may be provided with three or more openings so that the aperture control blades 7a may be eliminated, and a desired number of aperture sizes can be achieved. It is also possible to have only the super macro mode in addition to the normal operative mode, instead of having two macro modes.

According to the present invention, it is possible to achieve a large focal depth, and a clear picture can be therefore taken at all times without regard to the nature of the object which is to be photographed simply by selecting the operating mode of the camera. This also in no way interferes with the photographing of objects which are located from an intermediate range to an infinitely far range as long as an appropriate lighting condition is available.

The following is a description of how the super macro operative mode may be designed.

As mentioned earlier, as the mode selection lever 4 is moved from the normal operative mode (N) to the super and ultra macro operative modes (SM and USM), it is necessary to increase the possible range of the forward travel of the lens because, for a lens of a given focal length, as the distance to the photographic object decreases, the increase ratio of the movement of the focal point of the lens progressively increases.

Figure 9:
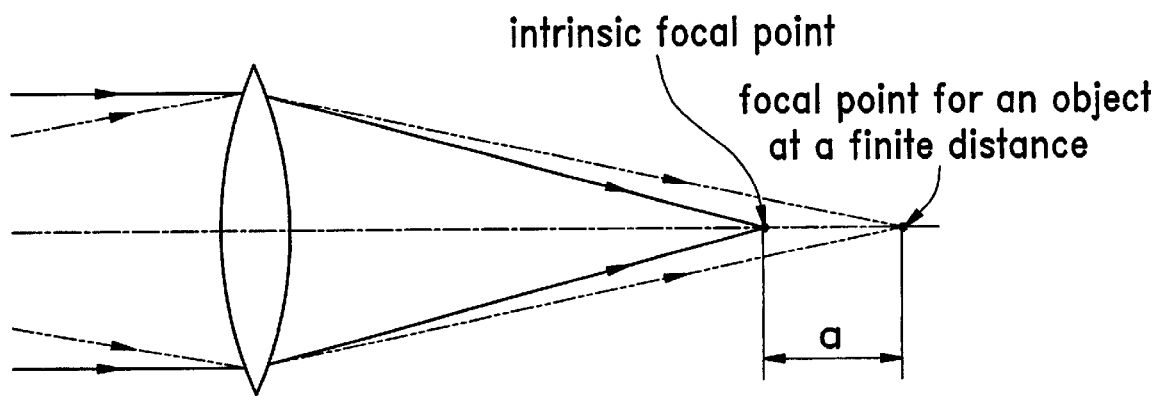
FIG. 9 is a diagram showing the travel a of the focal point as distance to the object changes.

Referring to FIG. 9, an incident light beam from an infinitely far point which passes through a lens converges on an intrinsic focal point (film surface). However, when the incident light beam from a finite distance passes through the lens, it converges on a point which is behind the intrinsic focal point by a distance a. Thus, the focal point recedes as the distance between the camera and the photographic object decreases. In a camera, the lens is pushed forward as the distance to the object decreases so as to place the focal point always on the film surface.

This is further described with reference to FIGS. 10 to 13 where a lens having a focal length of 25 mm (f=25 mm) and ISO 100 photographic film are used. However, as will be readily appreciated by a person skilled in the art, the same principle is applicable also when different lenses and different photographic films are used.

Figure 10:
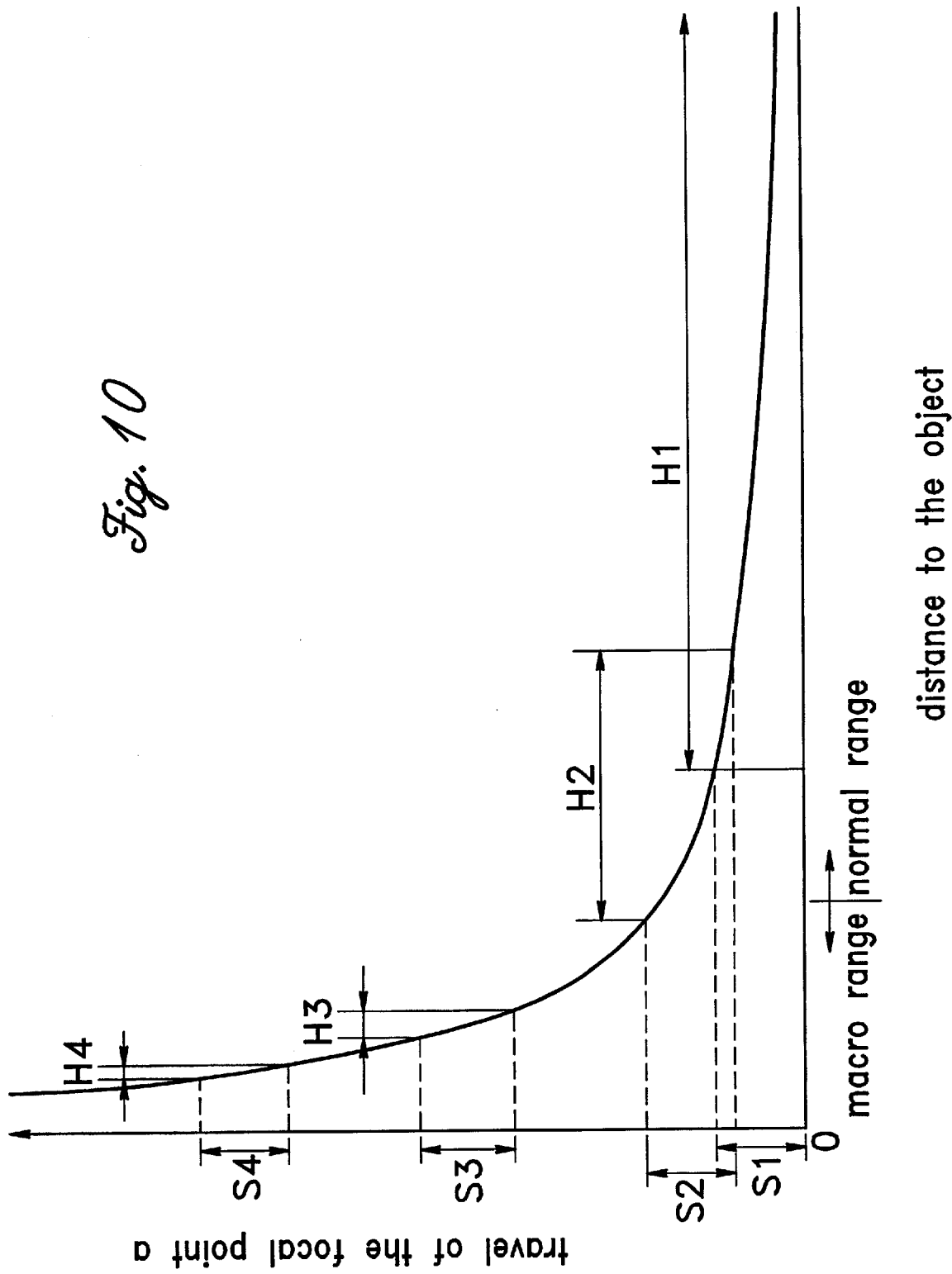
FIG. 10 is a diagram showing the relationship between the focal depth and the distance to the object.

In the graph of FIG. 10, the horizontal coordinate represents the distance between the camera and the photographic object (range) and the vertical coordinate represents the travel a of the focal point away from the intrinsic focal point. As the graph clearly indicates, as the distance between the camera and the photographic object decreases, the corresponding travel a of the focal point progressively increases. In particular, in the region between the normal operative mode and the super macro mode (normally at the distance of approximately 1 m), the travel a of the focal point sharply increases. Thus, it becomes necessary to move the lens by a significant distance in order to allow the camera to take pictures at close range. Such a lens moving mechanism requires a highly complex and expensive mechanism. This is one of the reasons why the normal cameras are not equipped with the capability to take pictures at close range.

Each lens has a distance range over which an image can be formed on the film surface with a tolerable sharpness. The sharpness of the image is defined by the size of the circle of least confusion which, in this case, is defined at the value of 0.05 mm. Based on this criterion, the graph of FIG. 10 shows the depth of focus for four different distances to the photographic object. These distances are selected such that the lens position is at a mid point of each of the four different travel ranges S1 to S4. As the distance to the photographic object diminishes, the change rate of the travel a of the lens (S1 to S4) progressively increases while the depth of focus (H1 to H4) progressively diminishes.

For instance, when the lens is moved to a mid point of the lens travel range S1 or to a position for an object 3.2 m away, the depth of focus reaches infinity on the far side, and approximately 1.6 m on the near side. When the lens is pushed slightly further out to a position suitable for a photographic object 1.3 m away (mid point of range S2), the focal depth diminishes as indicated by the distance range H2 or from about 1.0 m to 2.0 m. When the lens is further pushed out to a position (mid point of range S3) suitable for a photographic object 0.45 m away, the focal depth diminishes further, approximately from 0.42 to 0.53 m (H3). When the lens is even further pushed out to a position (mid point of range S4) suitable for a photographic object which is 0.37 m away, the focal depth diminishes even further, approximately from 0.24 to 0.30 m (H4).

Thus, when the camera is focused to an object at an extremely close range, it becomes progressively more difficult to achieve a proper focusing. Even if a proper focusing is achieved, the focal depth would be so small that any three dimensional object would not be focused as a whole. Also, any known auto focusing device is inadequate for a photographic object which is no more than 30 cm away from the camera.

Figure 11:
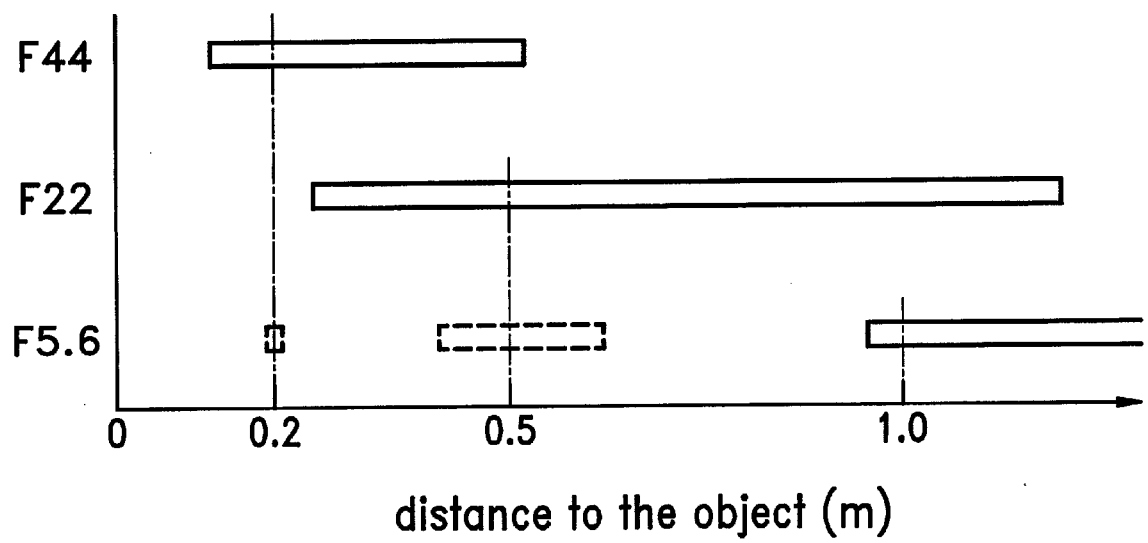
FIG. 11 is a diagram showing the relationship between the focal depth and the aperture opening.

According to the present invention, to resolve this problem, the aperture opening is dramatically reduced when the super macro or the ultra super macro operative mode is selected for taking a picture of an object at an extremely close range. FIG. 11 shows how the focal depth is increased by reducing the aperture opening. The three bars at the bottom of the graph of FIG. 11 indicate the focal depths when the lens is positioned for an object at the distances of 0.2 m, 0.5 m and 1.5 m, respectively, with the aperture opening of F5.6. The bar in the middle of the graph indicates the focal depth when the lens is positioned for an object at the distance of 0.5 m with the aperture opening of F22, and the bar at the top of the graph indicates the focal depth when the lens is positioned for an object at the distance of 0.2 m with the aperture opening of F44.

From this graph, it can be seen that the range of approximately from 0.1 m to infinity can be covered by three different lens positions by appropriately reducing the aperture opening. Furthermore, the focal depth for each of the lens positions overlaps the adjacent one, and is also so large that a satisfactory picture of three dimensional objects can be taken at any distance from an extremely close range to infinity. The two short bars indicated by dotted lines at the bottom of the graph show that, when the aperture opening is not reduced, the focal depths would be so small that not only would the three lens positions be inadequate for covering a close range without any breaks but also a properly focused picture of a three dimensional object cannot be taken at close range.

According to a conventional camera, the lens position is moved to a position suitable for the photographic object, and the shutter speed and the aperture opening are selected according to the brightness of the object. A lighting device is activated only when the lighting for the object is not adequate. Therefore, when the principle of such a conventional camera is extended to a camera for a macro picture taking mode, there is no linking between the activation of the lighting device and the macro picture taking mode, and the dramatic reduction in the focal depth renders the camera virtually useless for the intended purpose.

According to the super macro or the ultra super macro mode embodying the present invention, without detecting the distance to the object or the brightness of the object, and without changing the shutter speed, the lighting device is activated without regard to the surrounding condition. Also, the lens position and the dramatically reduced aperture opening are predetermined for each selected macro mode. The dramatically reduced aperture opening is balanced by the increased brightness of the object owing to the activation of the lighting device. The proximity of the object from the camera or the lighting device causes an extremely high level of brightness of the object, and this allows the dramatic reduction in the aperture opening. When the ISO sensitivity of the photographic film is 100, for instance, the optimum intensity of the strobe light can be computed from the following formula.

(guide number of the strobe light)/($F$ value of the lens)

When the film sensitivity is increased to ISO 200, it is equivalent to increasing the aperture opening by one notch. When the film sensitivity is increased from ISO 100 to ISO 400, it is equivalent to increasing the aperture opening by two notches. It is also known that photographic film has a certain latitude which, combined with some adjustment during the photographic developing process, provides a tolerance of about three notches from the standard value on the brighter side and about two notches on the darker side.

FIG. 12 shows the acceptable reach of the strobe light and the focal depth when the lens is positioned for each of ten different distances to the photographic object and a corresponding aperture opening is selected. In this case, the distances are covered from 0.1 m to 1.0 m by an increment of 0.1 m. The white bars each indicate the range of acceptable strobe lighting by considering the normal latitude of the photographic film. The shaded bars each indicate the range covered by the corresponding focal depth. The range covered by both the white bar and the shaded bar for each lens position or each aperture opening is the actual range over which a satisfactory picture of the object can be taken.

In practice, the aperture opening and the lens position can be moved continually by moving the mode selection lever 4 if such a mechanism is incorporated in the camera. Alternatively or additionally, a stepwise adjustment of the aperture opening and the lens position may be employed. In the illustrated embodiments, the aperture opening and the lens position are selected in a stepwise fashion for the convenience of description.

Figure 13:
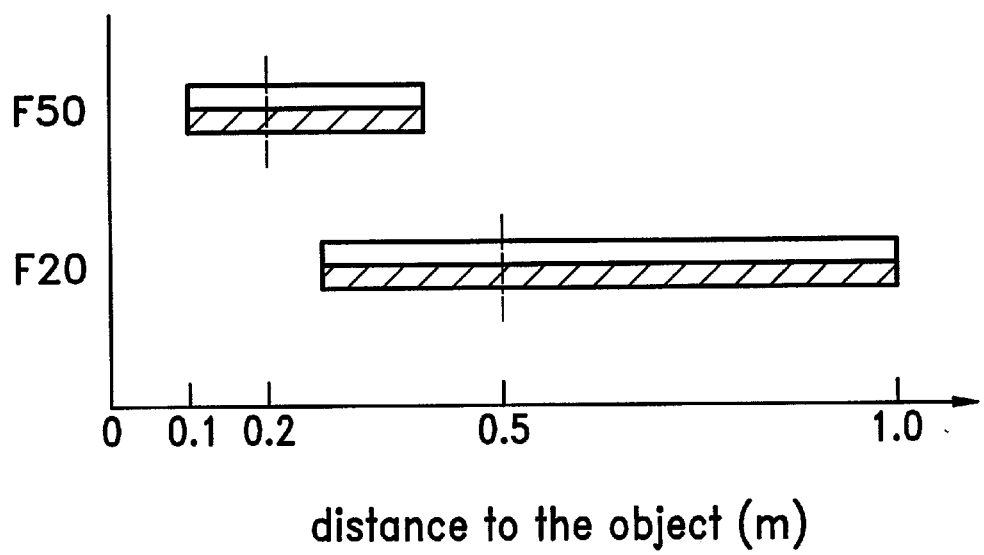
FIG. 13 is a diagram showing an example of selection of the lens positions and aperture openings for the super and ultra super macro modes.

FIG. 13 shows an example in which the macro operative mode consists of two steps. The super macro operative mode which adjoins the normal operative mode with some overlap incorporates the lens position for an object at the distance of 0.5 m and the aperture opening of F20. The ultra super macro operative mode which adjoins the super macro operative mode with some overlap incorporates the lens position for an object at the distance of 0.2 m and the aperture opening of F50. As can be seen from this graph, the camera is now capable of covering from the distance of only 0.1 m to infinity without any break.

The design criteria adopted in the illustrated embodiments is a circle of least confusion of 0.05 mm which is suitable for achieving high quality photographing by normal standard. The strobe light used in the illustrated embodiments consisted of an inexpensive strobe light unit incorporated in a compact camera, but proved to be adequate for achieving high quality photographing results over the entire range of distance. The distance between the camera and the photographic object should be measured between the object and the film surface, but can be approximated by the distance between the front end of the lens and the object. If a higher accuracy is desired, the distance between the film surface and the lens may be added to the distance between the lens and the object.

The present invention allows a simple, inexpensive camera to photograph objects at close range which, hitherto, has been possible only by an experienced photographer using a specialized camera. The modification from a conventional camera for manufacturing a camera according to the present invention is so minor that almost no increase in cost will be necessary. For instance, for a camera having a focal length of 25 mm, the travel of the lens required to cover a distance range of 1.0 m to infinity would be 0.6 to 0.7 mm. The lens travel must be increased to 4.5 to 4.8 mm for the camera to be adapted to the close range photographing according to the present invention. In the case of a camera having a focal length of 35 mm, the required lens travel would be 7 to 8 mm. The inventor has discovered that a lens travel of this order can be achieved without requiring any major modifications to the conventional inexpensive cameras. The required lens travel increases in proportion to the increase in the focal length of the lens of the camera.

The shutter speed may be changed, for instance may be reduced, when a macro mode is selected. But, it was confirmed by the inventor that the latitude of the commercially available photographic film is so large that a satisfactory super macro or ultra super macro photographing is possible without changing the shutter speed from that for the normal operative mode. In particular, the strobe light has such a short duration of light emission that the effective shutter speed is determined by the strobe light. The elimination of the need for changing the shutter speed is particularly beneficial in reducing the cost of the camera.

Figure 14:
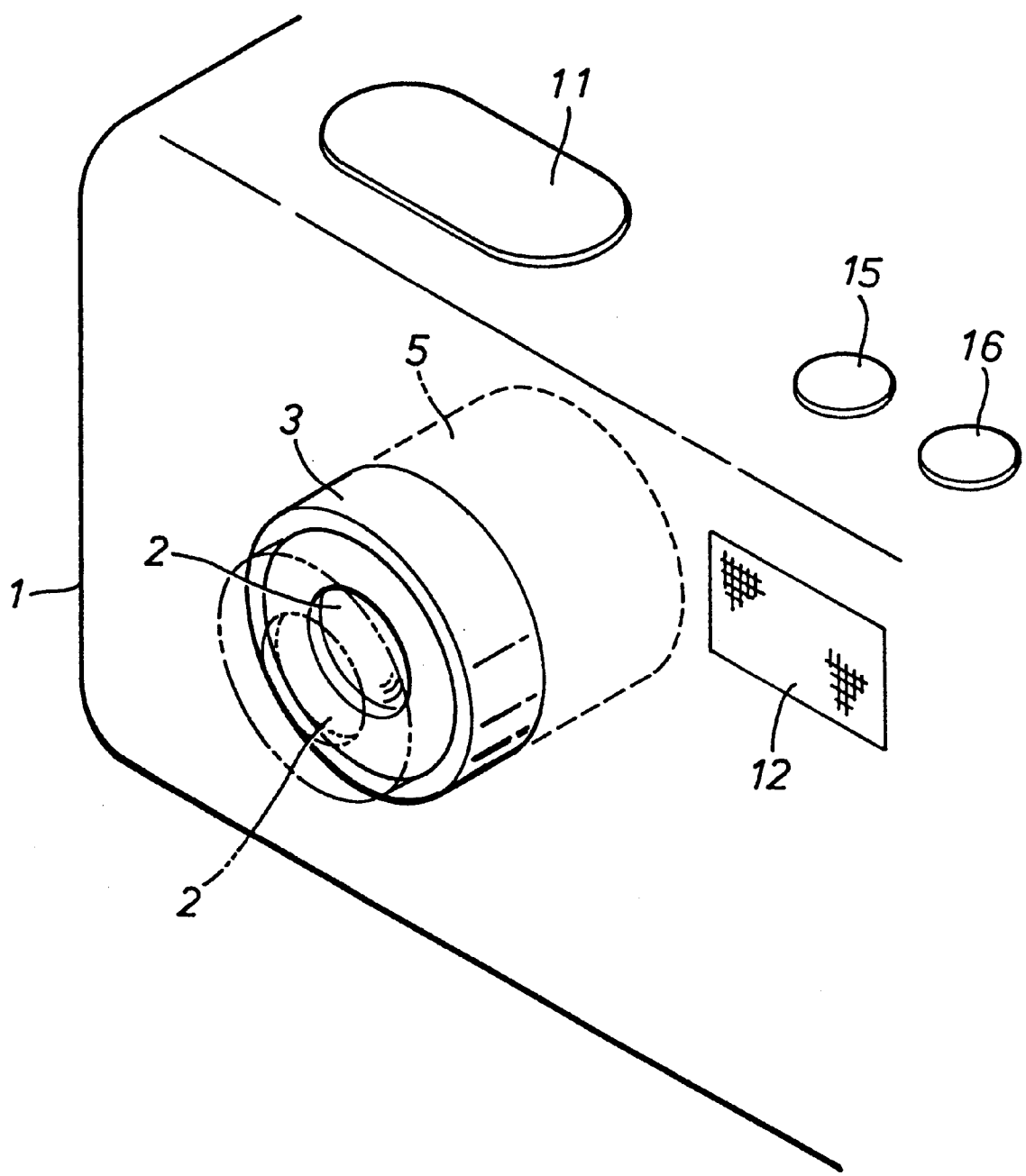
FIG. 14 is a view similar to FIG. 2 showing a third embodiment of the present invention.

The illustrated embodiments are generally based on the manual selection of the operation modes, but it is also possible to automate the operation mode selection to a desired extent. For instance, as illustrated in FIG. 14, the camera body 1 may be incorporated with a super macro button 15 for selecting the super macro mode (SM) and an ultra super macro mode button 16 for selecting the ultra super macro mode (USM) at an upper part thereof. An additional button may also be provided on the camera body for selecting between the non-operative mode (O) and the normal operative mode (N).

When a close range photographing is desired, either one of the macro push buttons 15 or 16 is pressed. This causes the cam tube 5 to be turned by a prescribed angle. In this case, the cam tube 5 is rotatably supported by the camera body 1, and the retaining tube 6 as well as the ornamental ring 2 are mounted to the camera body 1 in an axially slidably but rotatably fast manner. The internal structure for the adjustment of the focusing and aperture opening may be identical to that described in the previous embodiment or other conventional arrangements.

Figure 15:
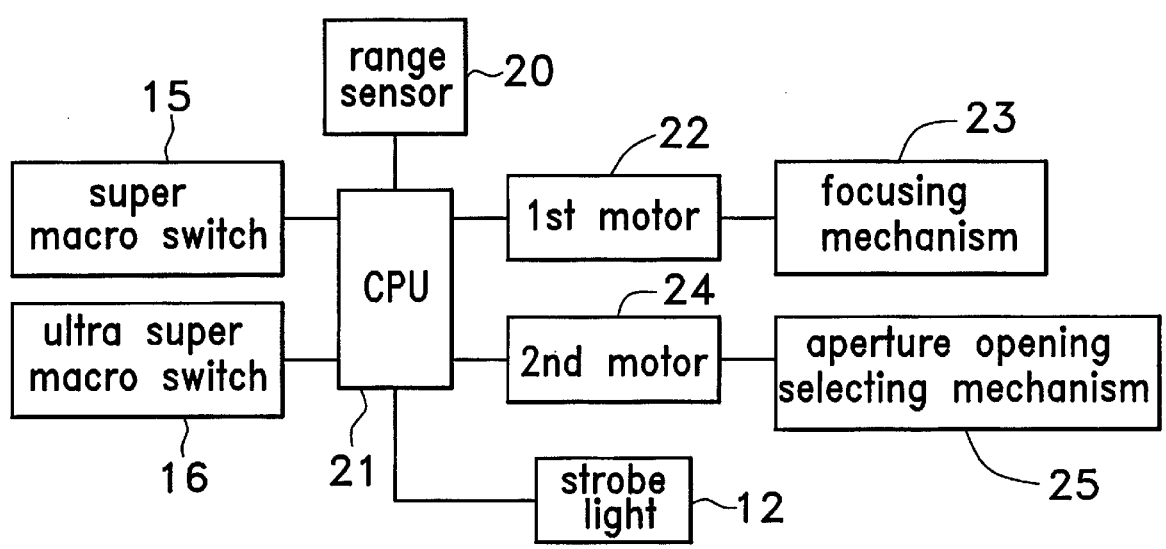
FIG. 15 is a block diagram showing the functional structure of the third embodiment.

FIG. 15 illustrates the functional structure of the third embodiment. The switches 15 and 16 are connected to a CPU 21 which in turn controls a first motor 22 for actuating a focusing mechanism 23 and a second motor 24 for actuating an aperture opening selecting mechanism 25. The CPU 21 is programmed in such a manner as to adjust the focusing mechanism 23 appropriately when either one of the switches 15 and 16 is closed. At the same time, the CPU 21 forces the aperture opening selecting mechanism 25 into closing the aperture opening as required. Preferably, the CPU 21 also enables the strobe light 12 when either one of the macro modes is selected. To fully automate the operation of the camera, a range sensor 20 may be provided in the camera so that the adjustment of the focusing mechanism 23 may be accomplished simply by aiming the camera to the object to be photographed.

Thus, according to the present invention, because a number of settings which make the camera suitable for close range photographing can be achieved with a single operation, even an inexperienced person can take a satisfactory picture of an object at a close range. In particular, by reducing the aperture opening when a macro mode is selected, the focal depth can be increased, and a clear picture of the close range object can be taken without regard to the condition under which the object is placed in relation with the surrounding objects. By enabling the strobe light or a flash bulb when a macro mode is selected, it is possible to avoid the possibility of any insufficient photographic exposure of the photographic film.

This new possibility opens up new applications of a camera such as preparation of data for various purposes as opposed to conventional inexpensive cameras which are considered to be useful for taking snapshot pictures. For instance, cameras according to the present invention would be useful in medical applications (by taking pictures of affected organs before and after treatment), educational applications (by taking pictures of small creatures, insects, plants and minerals), civil engineering and construction works (taking pictures of various parts of structures and furnishings of interest), forensic applications, and house keeping applications (by taking pictures of cooked dishes, flower arrangements, hand-crafted objects, knitting, lace and sewing works), among other possibilities. Cameras according to the present invention are so easy and simple to use that such pictures can be taken without any professional help.

Although the present invention has been described in terms of preferred embodiments thereof, it is obvious to a person skilled in the art that various alterations and modifications are possible without departing from the scope of the present invention which is set forth in the appended claims.

What we claim is:

1. An all range camera, comprising:

lens moving means for moving a lens to move a focal point thereof;

aperture closing means for selecting an aperture opening for said lens, said aperture closing means comprising a moveable plate including a small fixed aperture formed therein;

lighting means for illuminating an object of said camera; and switching means for controlling said lens moving means, said aperture closing means, and said lighting means, said switching means being adapted to select a super macro mode for taking a clear picture of an object within a wide close range region in addition to a normal mode for taking a picture of an object within a normal range region;

when said super macro mode is selected by said switching means, said lens moving means moving said lens substantially more forward than that required for said normal mode so as to focus on an object located in said close range region, said aperture closing means moving said moveable plate to place the small fixed aperture in an optical axial line of the lens so as to achieve a large focal depth that is required to take a clear picture of an object located within said wide close range region without regard to the brightness of the object, and said lighting means activating so as to illuminate the object with a prescribed brightness;

said lens moving distance, said small fixed aperture, and said brightness achieved by said lighting means being defined in such a manner that said close range region may be defined in a close range over a large distance region at least adjacent to said normal range region.

2. An all range camera according to claim 1, wherein said switching means comprises a single operating member which allows selection of said super macro mode.

3. An all range camera according to claim 1, wherein, when said super macro mode is selected in succession to said normal mode, said lens is moved by said lens moving means from a position suitable for said normal mode to a position suitable for said super macro mode, said aperture opening is substantially reduced in accordance with the movement of said lens, separately from the function of adjusting to the brightness of an object in the normal mode, and said lighting means is forced into activation when taking a picture, separately from the function of supplementing the brightness of an object in said normal mode.

4. An all range camera, comprising:

lens moving means for moving a lens to move a focal point thereof;

aperture closing means for selecting an aperture opening for said lens;

lighting means for illuminating an object of said camera; and switching means for controlling said lens moving means, said aperture closing means, and said lighting means, said switching means being adapted to select a super macro mode for taking a clear picture of an object within a wide close range region in addition to a normal mode for taking a picture of an object within a normal range region, when said super macro mode is selected by said switching means, said lens moving means moving said lens substantially more forward than that required for said normal mode so as to focus on an object located in said close range region, said aperture closing means selecting a prescribed small aperture opening so as to achieve a large focal depth that is required to take a clear picture of an object located within said wide close range region without regard to the brightness of the object, and said lighting means activating so as to illuminate the object with a prescribed brightness;

said lens moving means, said small aperture opening, and said brightness achieved by said lighting means being defined in such a manner that said close range region may be defined in a close range over a large distance region at least adjacent to said normal range region; and wherein said switching means is adapted to additionally select an ultra super macro mode for an even closer range region, and said lens moving distance and said small aperture opening are defined separately for said super macro mode and said ultra super macro mode, said switching means comprising a single operating member which allows selection of said ultra super macro mode.

5. A wide range focusing camera, comprising:

lens moving means for moving a lens of the camera for selecting a distance range for a clear photographic shot, wherein a lens position for a shot at a closer distance range is more forward than a lens position for a shot at a normal distance range;

aperture opening changing means for changing an aperture opening of the camera;

a lighting device for illuminating an object of the camera; and a selector switch for selecting from a normal operative mode and a super macro operative mode;

said normal operative mode being defined in such a way that said lens is positioned for a shot at said normal distance range, and said aperture opening is selected for a normal shot;

said super macro operative mode being defined in such a way that said lens is positioned for a shot at said closer distance range which adjoins said normal distance range, said lighting device is activated, and said aperture opening changing means positioning an aperture plate, said aperture plate defining a fixed and substantially smaller aperture opening for said super macro operative mode than said normal operative mode, such that said aperture opening is reduced so as to be compatible with the activation of said lighting device at said closer distance range.

6. A wide range focusing camera according to claim 5, wherein said selector switch comprises a single member which allows selection of either one of said normal and super macro operative modes.

7. A wide range focusing camera according to claim 5, wherein said normal distance range and said closer distance range overlap each other.

8. A wide range focusing camera according to claim 5, wherein said aperture opening changing means comprises an aperture plate for defining at least two fixed aperture openings which are selectable for said normal and super macro operative modes, respectively.

9. A wide range focusing camera, comprising:

lens moving means for moving a lens of the camera for selecting a distance range for a clear photographic shot, wherein a lens position for a shot at a closer distance range is more forward than a lens position for a shot at a normal distance range;

aperture opening changing means for changing an aperture opening of the camera;

a lighting device for illuminating an object of the camera; and a selector switch for selecting from a normal operative mode and a super macro operative mode;

said normal operative mode being defined in such a way that said lens is positioned for a shot at said normal distance range, and said aperture opening is selected for a normal shot;

said super macro operative mode being defined in such a way that said lens is positioned for a shot at said closer distance range which adjoins said normal distance range, said lighting device is activated, and said aperture opening is reduced so as to be compatible with the activation of said lighting device at said closer distance range;

wherein said selector switch additionally allows selection of an ultra super macro operative mode which is defined in such a way that said lens is positioned for an even closer distance range which adjoins said super macro distance range, said lighting device is activated, and said aperture opening is reduced so as to be compatible with the activation of said lighting device at said even closer distance range.

10. A wide range focusing camera according to claim 9, wherein said normal distance range and said closer distance range overlap each other, and said closer distance range and said even closer distance range overlap each other.

11. A wide range focusing camera, comprising:

a focusing mechanism for selectively moving a lens of the camera to at least two different positions which are suitable for a relatively long distance shot and a relatively short distance shot, respectively, the position suitable for the relatively short distance shot being more forward than the position suitable for the relatively long distance shot;

an aperture opening selecting mechanism for defining at least two different aperture opening areas;

a control member for actuating the focusing mechanism so as to move the lens to a selected one of the two positions;

cooperating engagement members provided in moveable parts of the focusing mechanism and the aperture opening selecting mechanism so as to move the aperture opening selecting mechanism into selecting a smaller one of the aperture opening areas when the focusing mechanism is actuated into moving the lens to the position suitable for the relatively short distance shot; and a lost motion mechanism for allowing the aperture opening selecting mechanism to select a smaller one of the aperture opening areas without interfering with a member for selecting an aperture opening area when the lens is at the position suitable for the relatively long distance shot.

12. A wide range focusing camera according to claim 11, further comprising a switch for enabling a lighting device which is adapted to be activated when the focusing mechanism is actuated into moving the lens to the position suitable for the relatively short distance shot.

13. A wide range focusing camera according to claim 11, wherein the aperture opening selecting mechanism comprises a pluralty of aperture control blades.

14. A wide range focusing camera according to claim 13, wherein the aperture opening selecting mechanism further comprises a moveable plate member having an aperture opening formed therein and adapted to be selectively moved so as to place the aperture opening in an optical axial line of the lens.

15. A wide range focusing camera according to claim 11, wherein the aperture opening selecting mechanism comprises a moveable plate member having a plurality of aperture openings formed therein and adapted to be selectively moved so as to place a selected one of the aperture openings in an optical axial line of the lens.

16. A wide range focusing camera according to claim 11, wherein the control member is adapted to be manually actuated.

17. A wide range focusing camera according to claim 11, wherein the control member is adapted to be actuated by a powered motor.

18. A wide range focusing camera according to claim 17, further comprising an automatic focusing mechanism which actuates the powered motor according to a signal from a range sensor.

19. An all range camera, comprising:

a camera body;

a cam tube rotatably attached to the camera body, said cam tube comprising a cylinder with a cam slot formed in a wall thereof;

a mode selection lever attached to the cam tube, said mode selection lever allowing the cam tube to be rotated between at least two prescribed positions corresponding to at least two operation modes;

a retaining tube coaxially received in the cam tube in an axially slidable manner;

a lens retained by the retaining tube;

an aperture control mechanism formed in the retaining tube, said aperture control mechanism comprising:
aperture control blades forming an opening through the aperture control mechanism,
a ring member surrounding said aperture control blades and engaging said aperture control blades to control a diameter of the opening formed therein, and
an engagement piece radially protruding from a circumferential edge of the ring member;

a cam pin formed on an outer surface of the retaining tube, said cam pin being slidably mounted in the cam slot, whereby a force exerted on said cam pin by said cam slot in response to rotational movement of said mode selection lever causes said retaining tube to move axially in said cam tube; and an engagement arm formed on an inner surface of the retaining tube;

whereby when a super macro mode is selected by the mode selection lever, the cam slot engages said cam pin to provide a lateral force upon the cam pin causing an axial sliding and rotation of the retaining tube, said axial sliding causing the retaining tube to slide in a forward direction and said axial rotation causing the engagement arm to engage the engagement piece providing a force upon the engagement piece to rotate the ring member, thereby to reduce the opening through the aperture control mechanism.

20. The all range camera of claim 19, wherein said cam slot is spirally formed in the wall of the cam tube.

21. An all range camera, comprising:

a camera body;

a cam tube rotatably attached to the camera body, said cam tube comprising a cylinder with a cam slot formed in a wall thereof;

a mode selection lever attached to the cam tube, said mode selection lever allowing the cam tube to be rotated between at least two prescribed positions corresponding to at least two operation modes;

a retaining tube coaxially received in the cam tube in an axially slidable manner;

a lens retained by the retaining tube;

an aperture control mechanism formed in the retaining tube, said aperture control mechanism comprising:
aperture control blades forming an opening through the aperture control mechanism,
a plate member pivotally mounted adjacent the aperture control blades and engaging the retaining tube through a gear, and
a small opening formed in the plate member, said small opening being smaller than the opening formed by the aperture control blades; and a cam pin formed on an outer surface of the retaining tube, said cam pin being slidably mounted in the cam slot, whereby a force exerted on said cam pin by said cam slot in response to rotational movement of said mode selection lever causes said retaining tube to move axially in said cam tube; and whereby when a super macro mode is selected by the mode selection lever, the cam slot engages said cam pin to provide a lateral force upon the cam pin causing an axial sliding and rotation of the retaining tube, said axial sliding causing the retaining tube to slide in a forward direction and said axial rotation causing rotation of the gear thereby causing the plate member to pivot such that the small opening formed in the plate member is aligned with the opening formed by the aperture control blades.

22. The all range camera of claim 21, wherein said cam slot is spirally formed in the wall of the cam tube.

23. A wide range focusing camera according to claim 4, wherein said aperture closing means comprises a moveable plate with a small fixed aperture and a smaller fixed aperture formed therein, said small fixed aperture corresponding to the prescribed small aperture opening for said super macro mode, and said smaller fixed aperture corresponding to the small aperture opening for said ultra super macro mode.

24. A wide range focusing camera according to claim 9, wherein said selector switch comprises a single member which allows selection of any of said normal, super macro, and ultra super macro modes.

25. A wide range focusing camera according to claim 9, wherein the aperture opening for said super macro operative mode and the aperture opening for said ultra super macro operative mode are predetermined.

26. A wide range focusing camera according to claim 9, wherein said aperture opening changing means comprises an aperture plate for defining at least three fixed aperture openings which are selectable for said normal, super macro, and ultra super macro operative modes, respectively.

27. A wide range focusing camera, comprising:

a lens;

a lens moving mechanism for moving said lens to move a focal point thereof;

an aperture control mechanism selectively defining a normal range aperture, a super macro aperture, and an ultra super macro aperture, wherein said normal range aperture corresponds to a normal focal depth range, said super macro aperture corresponds to a super macro focal depth range, and said ultra super macro aperture corresponds to an ultra super macro focal depth range;

a light source; and a control member for actuating the aperture control mechanism to select one of the normal range aperture, the super macro aperture, and the ultra super macro aperture;

wherein said normal focal depth range, said super macro focal depth range, and said ultra super macro focal depth range collectively span a focal depth of about 10 cm to infinity.

28. The wide range focusing camera of claim 27, further comprising:

a cooperating engagement mechanism moveably connected to said lens moving mechanism and said control member so as to select the normal range aperture when the lens moving mechanism is actuated into moving the lens to a position corresponding to the normal focal depth range, to select the super macro aperture when the lens moving mechanism is actuated into moving the lens to a position corresponding to the super macro focal depth range, and to select the ultra super macro aperture when the lens moving mechanism is actuated into moving the lens to a position corresponding to the ultra super macro focal depth range.

29. The wide range focusing camera of claim 27, wherein:

said normal range aperture comprises a plurality of normal range apertures corresponding to the normal focal depth range; and said aperture control mechanism further comprises:
- a plurality of aperture control blades, said aperture control blades variably defining the plurality of normal range apertures; and
- a moveable plate member having said super macro aperture and said ultra super macro aperture formed therein and adapted to be selectively moved so as to place a selected one of the super macro aperture and the ultra super macro aperture in an optical axial line of the lens.

30. A wide range focusing camera, comprising:

a lens;

a lens moving mechanism for moving said lens to move a focal point thereof; and an aperture control mechanism selectively defining in addition to at least one normal range aperture, a second aperture corresponding to a focal depth of from approximately 10 cm to a distance greater than a minimum distance of a focal depth corresponding to said normal range aperture.

31. A wide range focusing camera, comprising:

a lens;

a lens moving mechanism for moving said lens to move a focal point thereof; and an aperture control mechanism selectively defining a normal range aperture and a second aperture, wherein said second range aperture corresponds to a distance range of approximately 40 cm or less.

32. The wide range focusing camera of claim 31, wherein said second range aperture corresponds to a distance range of approximately 30 cm or less.

* * * * *